No. 869,831.  
PATENTED OCT. 29, 1907.  
R. P. DE REMER.  
CAR STANCHION.  
APPLICATION FILED AUG. 7, 1907.
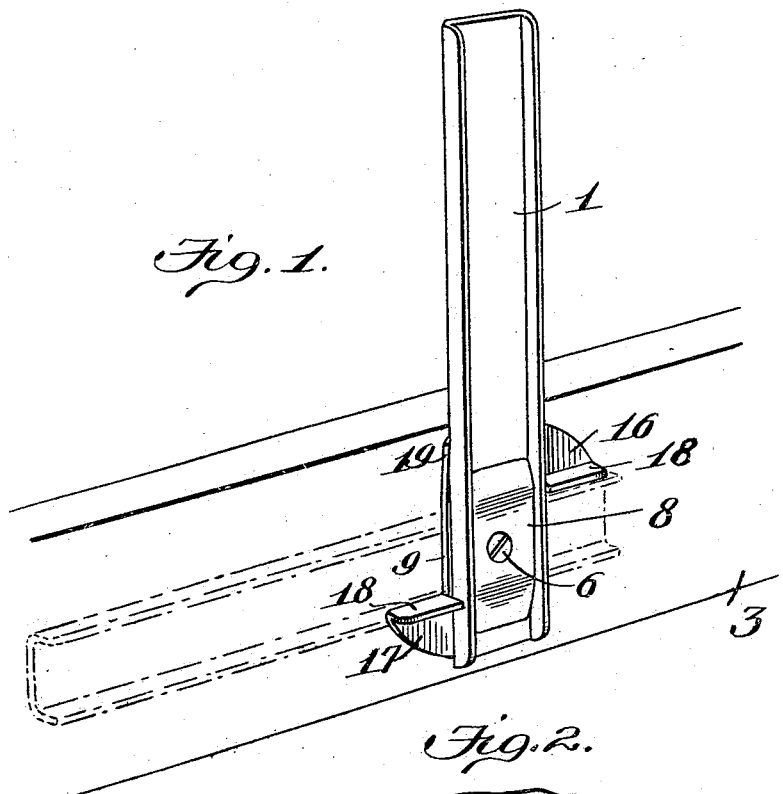
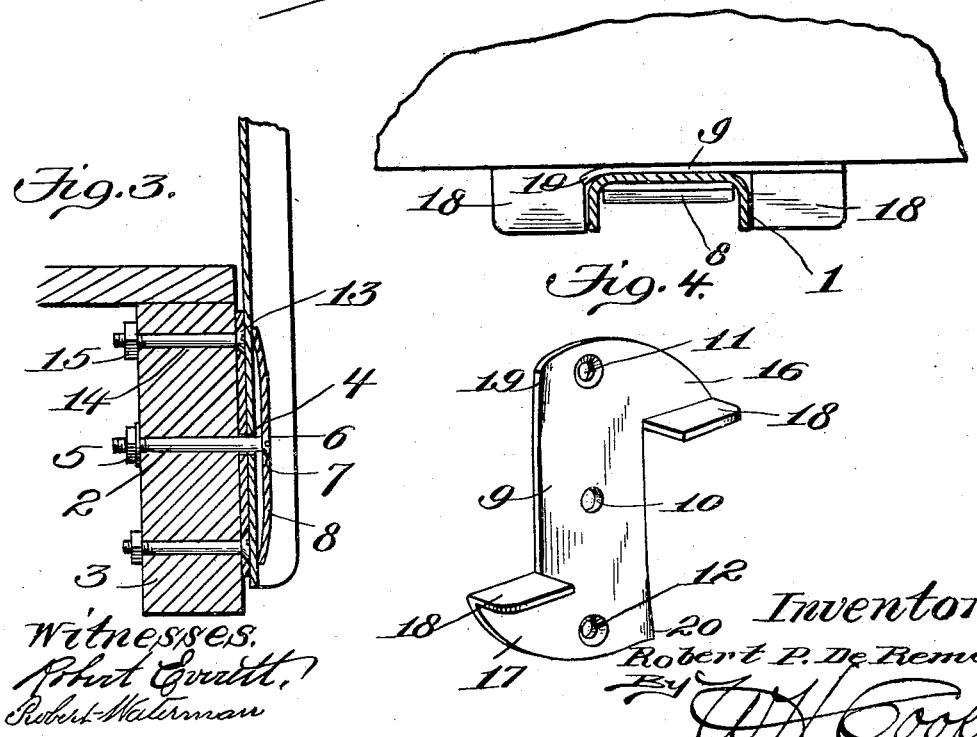
Witnesses.  
Inventor:  
Robert P. De Remer

UNITED STATES PATENT OFFICE.

ROBERT P. DE REMER, OF HOUMA, LOUISIANA, ASSIGNOR OF ONE-HALF TO ALFRED T. GERRANS, OF HOUMA, LOUISIANA.

CAR-STANCHION.

No. 869,831.

Specification of Letters Patent.

Patented Oct. 29, 1907.

Application filed August 7, 1907. Serial No. 387,536.

*To all whom it may concern:*

Be it known that I, ROBERT P. DE REMER, a citizen of the United States, residing at Houma, in the parish of Terrebonne and State of Louisiana, have invented certain new and useful Improvements in Car-Stanchions, of which the following is a specification.

This invention relates to car stanchions; and the object thereof is to provide in a manner as hereinafter set forth a car stanchion which, when occasion so requires, can be readily shifted from a horizontal position to a vertical position and locked in such latter position to perform its function.

Further objects of the invention are to provide a car stanchion which shall be simple in its construction, readily shiftable from and to operative position, strong, durable, efficient in its use, readily connected to the car and inexpensive to manufacture.

With the foregoing and other objects in view, the invention consists in the novel construction, combination and arrangement of parts hereinafter more specifically described and illustrated in the accompanying drawings, wherein is shown the preferred embodiment of the invention, but it is to be understood that changes, variations and modifications can be resorted to which come within the scope of the claims hereunto appended.

In describing the invention in detail reference is had to the accompanying drawings wherein like characters denote corresponding parts throughout the several views, and in which—

Figure 1 is a perspective view of a car stanchion in accordance with this invention, showing the same attached to the side of the car and further showing in dotted lines the inoperative position of the stanchion-bar. Fig. 2 is a sectional plan; Fig. 3 is a longitudinal section, and, Fig. 4 is a detail of a combined locking and stop bracket for the stanchion bar.

Referring to the drawings by reference characters, 1 denotes the stanchion bar which is shown as constructed from a channel iron of the necessary length. The bar 1 is pivotally connected at its lower end through the medium of the bolt 2 to the side 3 of the car and said bar 1 is of such length as to project the desired distance above the top edge of the side 3 of the car. An opening 4 is provided in the lower portion of the bar 1 and through which projects the bolt 2. The latter extends through the side 3 of the car and is retained in position by a nut 5 mounted upon the inner end of the bolt 2. The bolt 2 at its outer end is formed with a head 6 which is adapted to be seated in a countersunk opening 7 formed in a bow-shaped retaining spring 8. The latter holds the head 6 of the bolt away from the bar 1 and further maintains the bar 1 in close proximity to a combined stop and lock bracket 9 so as to prevent the bar shifting longitudinally upon the bolt 2 and further assist in maintaining the bar in the position to which it has been adjusted as the spring has a tendency to maintain the bar in close contact with the bracket 9. The bracket 9 is formed with a plurality of openings 10, 11 and 12. Through the opening 10 projects the bolt 2 and the openings 11, 12 are adapted to receive the heads 13 of the bolts 14, these latter extending through the side 3 of the car and retained in position by the nuts 15 mounted upon the screw-threaded inner end thereof. The function of the bolts 14 is to secure the bracket 9 to the side of the car between the bar 1 and the side. The bracket 9 is formed at its top and bottom with offsets 16, 17 respectively. These offsets are alternately disposed with respect to each other and each of which terminates in an outwardly-extending wing 18. These wings are arranged at right angles with respect to the body portion of the bracket and the inner side edge of each of these wings constitutes a stop for the bar 1 when the latter is moved to a vertical position, and the lower faces of the wings are adapted to be engaged by the bar 1 when it is moved to horizontal position, thereby forming a stop to arrest further movement of the bar when swinging the same upon its pivot. The bracket 9 is formed with upset corners as at 19, 20. These upset corners are alternately disposed with respect to each other and constitute means to lock the bar 1 in a vertical position. The bar when moved to such position is adapted to spring past the upset portions 19, 20 and after clearing the upset corners 19, 20, such corners act as a means to arrest the downward movement of the bar 1 in case of accident. When the bar 1 is moved to vertical position it is confined between the upset corners 19, 20 and the inner side edges of the wings 18.

What I claim is—

1. A car stanchion comprising a bar pivoted at its lower end to the side of the car and capable of being shifted from a horizontal to a vertical position, and a combined lock and stop bracket between the bar and the side of the car and mounted upon the pivotal connection between the bar and the car, said bracket provided with means for limiting the movement of the bar in either direction and further having means for maintaining the bar in a vertical position.

2. A car stanchion comprising a bar pivoted at its lower end to the side of the car and capable of being shifted from a horizontal to a vertical position, a combined lock and stop bracket between the bar and the side of the car and mounted upon the pivotal connection between the bar and the car, said bracket provided with means for limiting the movement of the bar in either direction and further having means for maintaining the bar in a vertical position, and means bearing against the bar for maintaining it in close contact with said bracket.

3. A car stanchion comprising a combined lock and stop bracket provided with a pair of wings and a pair of upset corners, a pivoted bar arranged against the outer face of said bracket and adapted to be maintained in a vertical position by said upset corners and further having its movement limited in either direction by said wings.

4. A car stanchion comprising a combined lock and stop bracket provided with a pair of wings and a pair of upset corners, a pivoted bar arranged against the outer face of said bracket and adapted to be maintained in a vertical position by said upset corners and further having its movement limited in either direction by said wings, and means bearing against the lower portion of the bar for keeping it in close contact with said bracket.

5. A car stanchion comprising a combined lock and stop bracket, a shiftable bar, a pivot for the bar, and means mounted upon the pivot and engaging the bar for maintaining it in its shifted position.

6. A car stanchion comprising a fixed bracket provided with a pair of stops and a pair of locks, a pivot extending through said bracket carrying on its outer end a bow-shaped spring, and a bar mounted upon said pivot and interposed between the bracket and the spring.

7. A car stanchion comprising a fixed bracket provided with a pair of wings and upset corners, a shiftable bar adapted to have its movement in both directions arrested by said stop and maintained in a vertical position by said upset corners, and a spring bearing against the bar for keeping it in close contact with said bracket.

In testimony whereof I affix my signature in presence of two witnesses.

ROBERT P. DE REMER.

Witnesses:
EASTON DUVAL,
JOSEPH R. WAGNESPOCK.